Figure 4:
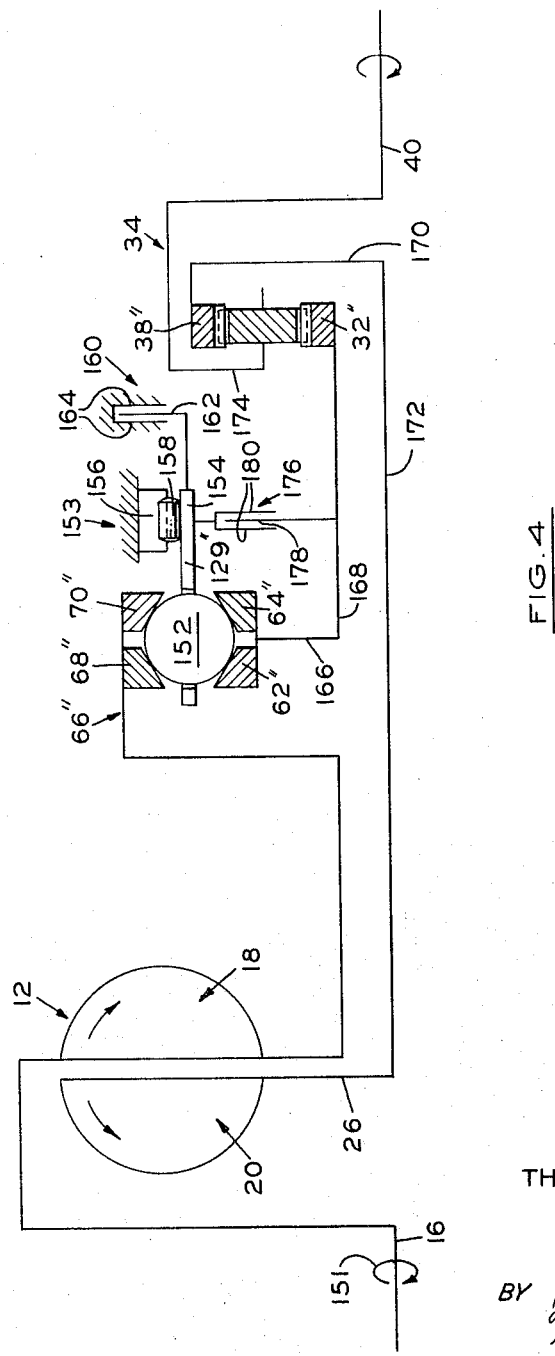

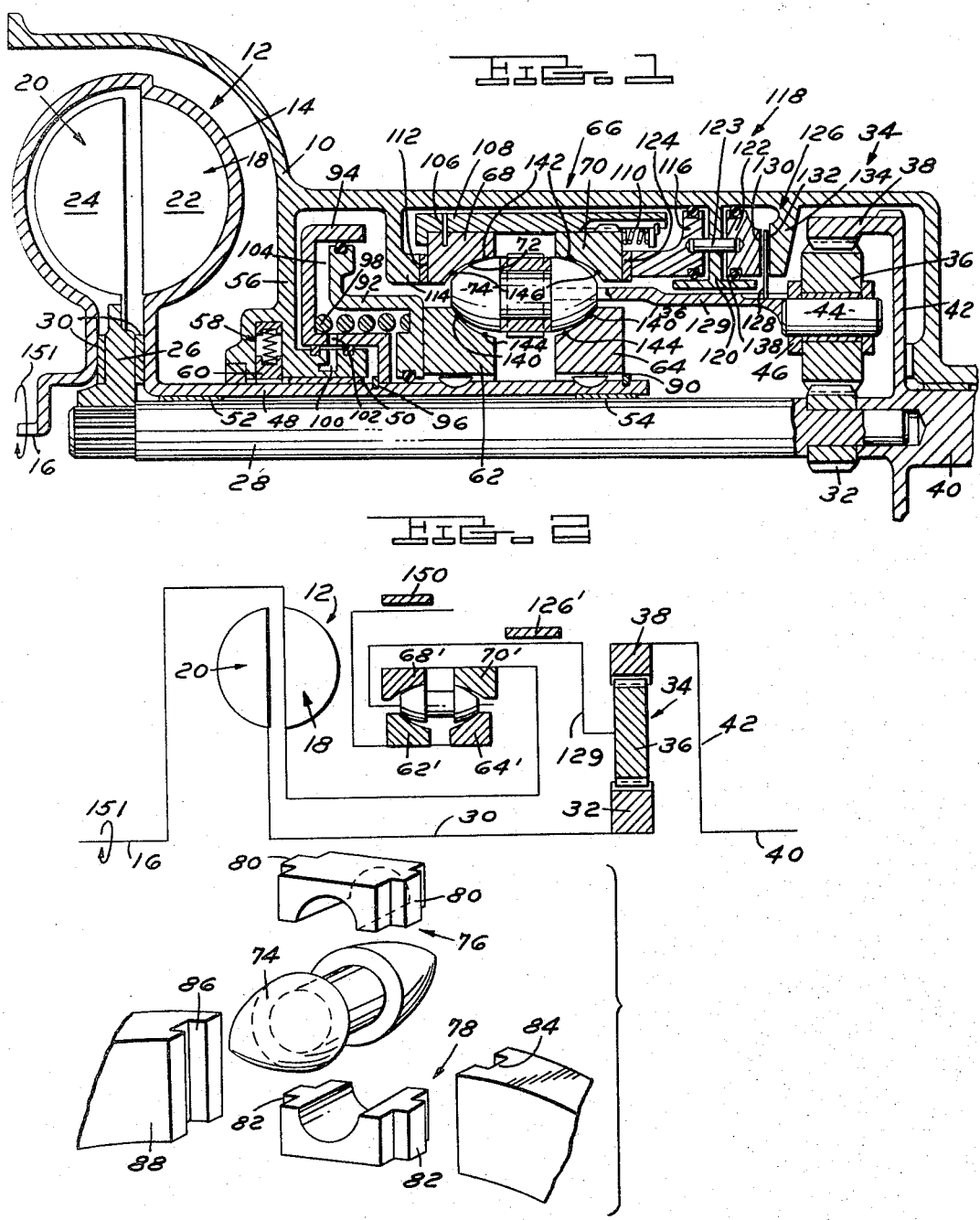

Jan. 24, 1967 T. R. STOCKTON 3,299,743
INFINITELY VARIABLE SPEED TRANSMISSION
Filed Dec. 31, 1964 2 Sheets-Sheet 2

THOMAS R. STOCKTON
INVENTOR

BY John R. Faulkner
Robert E. McCollum
ATTORNEYS

United States Patent Office 3,299,743
Patented Jan. 24, 1967

3,299,743
INFINITELY VARIABLE SPEED TRANSMISSION
Thomas R. Stockton, Northville, Mich., assignor to Ford
Motor Company, Dearborn, Mich., a corporation of
Delaware
Filed Dec. 31, 1964, Ser. No. 426,465
16 Claims. (Cl. 74—690)

This invention is a continuation-in-part of Ser. No. 334,177, filed December 30, 1963, and relates to an automatic transmission. More particularly, it relates to one providing an infinitely variable number of speed ratio changes.

One of the objects of the invention is to provide an automatic transmission having a number of variable speed drive units connected in parallel between power input and output shafts in a manner providing a regenerative drive and thereby increasing the operating efficiency.

Another object of the invention is to provide an automatic transmission of the stepless shift type that is simple in construction, easy to assemble and disassemble, and economical to manufacture.

A further object of the invention is to provide an automatic transmission combining the advantages of a mechanical friction drive device and a hydrodynamic drive in a manner to provide a split torque power path between power input and output shafts.

A still further object of the invention is to provide an automatic transmission having a fluid coupling and a friction drive unit connected in parallel to a power input shaft, and each driving different members of a planetary gearset connected to the output shaft in a manner providing a regenerative drive of the friction roller element unit.

Other objects, features, and advantages of the invention will become apparent upon reference to the succeeding detailed description thereof, and to the drawings illustrating the preferred embodiments thereof; wherein, FIGURE 1 is a cross-sectional view of the upper half of a transmission embodying the invention;

FIGURES 2 and 4 are modifications of the transmission of FIGURE 1 shown schematically; and, FIGURE 3 is an exploded perspective view of a detail of FIGURES 1 and 2.

FIGURE 1 shows a transmission having a bell-like stationary housing 10. At its forward end, the transmission includes a fluid coupling 12 that is enclosed by a rotatable cover or shell 14. The shell has an axial extension 16 connected to a drive shaft, not shown, which may be driven by any suitable source of power, such as, for example, the internal combustion engine for a motor vehicle.

Coupling 12 is of the continuously filled type, and has a pump or impeller member 18 and a turbine member 20. The pump consists of a number of circumferentially spaced blades 22 secured to cover 14, and facing a number of similarly shaped turbine blades 24. The turbine blades are secured to a hub 26 that is splined to one end of a power input shaft 28. A pair of thrust washers 30 rotatably locate the hub between portions of cover 14.

A sun gear 32, constituting one element of a planetary gearset 34, is fixed on the rear end of shaft 28. The gearset is of the simple three-element planetary type having a plurality (only one shown) of spaced pinion gears 36 meshing with sun gear 32 and a ring gear 38. The ring gear is fixed to a power output shaft 40 by a radial connecting portion 42. Pinion gears 36 are rotatably mounted upon shafts 44 supported in an annular carrier 46.

The hub of the fluid coupling cover 14 is extended axially to form a sleeve shaft 48. This latter shaft is rotatably supported on bearing members 50, 52, and 54 between a stationary extension 56 of housing 10 and drive shaft 28. The extension 56 is also formed as a housing for a slipper type fluid pressure supply pump 58 having a drive rotor 60 splined to the sleeve shaft 48.

The opposite end of shaft 48 is externally splined to a pair of axially spaced inner race portions 62 and 64 of a mechanical friction drive device 66. This device includes outer spaced race portions 68 and 70, all of the race portions having facing complimentary concave friction surfaces forming an annular raceway 72. The raceway receives a number of circumferentially spaced ovoid shaped friction rolling elements 74, which frictionally engage the raceway surfaces to provide a drive through the device in a manner to be described.

As best seen in FIGURE 3, the ovoid elements 74 are rotatably mounted in bearing portions 76 and 78, which have bosses 80, 82 slidable in mating grooves 84 and 86 in an annular carrier member 88. This construction permits rolling of the ovoid elements 74 as well as their radial movement relative to the carrier to effect a change in the drive ratios between the inner and outer races.

It should be noted that it is within the scope of the invention to use balls in place of the ovoids shown in FIGURE 1, in a manner shown in FIGURE 4, if desired. The use of ovoids is desirable, since it results in optimum normal contact loading; permits a reduction in clamping forces due to increased contact angles, as compared to balls; the Hertz stress due to decreased race curvature is reduced; and the spin losses at the contact points are reduced due to tracking closer to the true rolling diameter.

Inner race portion 64 is located axially in one direction against a snap ring 90. The race member 62, however, is axially slidable in either direction, and is abutted by an annular piston 92. The piston moves axially within a cylinder defined by a member 94. This member is located in one direction by a snap ring 96, and has a spring 98 between it and the piston 92. The spring lightly loads the inner race portion 62 against the ovoid 74 to contact it with the other inner and outer race portions. The spring is merely for maintaining the parts in initial engagement with each other. It does not provide sufficient force to load the inner race assembly into driving engagement with the ovoids 74; this is accomplished by means of the piston 92.

Fluid under pressure from pump 58 passes through a control system, not shown, which schedules fluid at the proper pressure to act against the piston 92 and force the inner race portion 62 against the ovoid 74 and other race portions. Fluid flows from the control system through passages 100 and 102 in extension 56 and member 94, respectively, into the chamber 104 defined between piston 92 and member 94.

Outer race portion 68 is secured by a pin 106 to a connector 108 that is splined to the outer race portion 70. A suitable spring 110, acting between connector 108 and outer race portion 70, biases the two race portions 68 and 70 towards each other, and into initial engagement with the ovoids 74. The front face of race portion 68 is adapted to cooperate with a friction material 112 secured to a radial extension 114 of housing 10. Race portion 70 is adapted to slide back and forth on the splines of connector 108, and is normally loaded into operational position against the ovoids 74 by means of an annular fluid pressure actuated piston 116.

The piston 116 constitutes one part of a double brake assembly 118. The housing 10 is formed with an annular partition 120, having a T shape in cross section. The opposite sides of the partition form recesses for slidably and sealingly receiving the piston 116 and another annular piston 122. The pistons are non-rotatably secured to the housing by a pin 123. The front portion of piston 116 is formed with a suitable friction material 124 for engagement with the outer race portion 70, which, together with the friction surface 112, acts to prevent rotation of the outer race portions upon leftward movement of the piston 116.

The piston 122 constitutes the actuating member for a Reverse brake 126. This latter brake includes a friction disc 128 secured to an extension 129 of the ovoid carrier 88, the disc cooperating with friction surface 130 on piston 122 and surface 132 on an extension 134 of housing 10. Movement of piston 122 to the right by fluid under pressure will engage the Reverse clutch to prevent rotation of the ovoid carrier 88 and gearset carrier 46. The clutch is disengaged by suitable spring means, not shown. The fluid chambers 136 and 138, defined between the pistons 116 and 122 and the partition 120, are adapted to be supplied with fluid under pressure through suitable passages, not shown, from the control system.

Either of the pistons 92 or 116 may be used as the loading piston to clamp the race portions into engagement with the ovoids 74 and provide a drive through the device. Whichever of the pistons is selected to apply the clamping forces, the other piston generally is used to effect a change in the drive ratio by axially moving the race portion associated with it. Assuming, for example, that piston 116 is chosen as the loading piston, and piston 92 as the drive ratio determining piston, the two pistons, therefore, will be actuated simultaneously, piston 92 moving inner race portion 62 toward portion 64 to effect a radial movement of the ovoids 74. The fluid pressure against piston 116 accomplishes three effects; one, the fluid pressure level is such as to permit the separation of outer race portions 68 and 70 to permit the radial ovoid movement; secondly, the pressure clamps the outer race between piston 116 and housing portion 114 to hold the outer race stationary; and thirdly, the pressure clamps the entire assembly together with sufficient force to provide the desired drive through it.

In the position shown, the friction drive is conditioned for a maximum underdrive ratio, with the inner race portions in their closest adjacent positions. The inner race portions 62 and 64 contact the ovoids 74 at points 140, while the outer race portions 68 and 70 are contacted at points 142. Since the drive device is permanently conditioned by a reduction drive, due to the grounding of the outer race, maximum separation of the inner race portions 62 and 64 will still provide an underdrive of the carrier 88 and 129; however, the ratio is one that closely approaches a one-to-one drive ratio. In this latter case, the ovoids would have point contacts with the inner and outer race portions at 144 and 146, respectively.

The control system progressively and continuously changes the drive ratio of the device 66 with changes in predetermined parameters, such as, for example, vehicle speed and engine torque demand. That is, the fluid under pressure against pistons 92 and 116 will progressively move the race portions 62 and 70 so that the ovoid drive changes in infinite increments from a maximum underdrive to a minimum underdrive.

In over-all operation, Neutral is obtained by venting any fluid under pressure behind pistons 116, 92, and 122. Since the outer race is free to rotate, there is no reaction member for the friction drive, and the ovoid carrier will rotate freely without transmitting drive to the carrier 46, ring gear 38, and output shaft 40. The free rotation of carrier 46 upon drive by sun gear 32 also fails to drive ring gear 38.

For forward speed operation, fluid at the proper pressure is admitted behind pistons 92 and 116 to initially position the friction drive 66 for a maximum underdrive, as shown, and to provide the proper clamping pressure forces against the races, not only to load the race portions and ovoids together, but prevent rotation of the outer race portions 68 and 70 by abutment between the friction materials 112 and 124. The friction drive 66 is thus conditioned for a maximum reduction drive. Reverse brake 126 is disengaged.

Forward or clockwise rotation of coupling cover 14, in the direction of arrow 150, rotates both impeller 18 and the inner race portions 62 and 64 in the same direction. Turbine 20 and sun gear 32 are thus driven in the same direction. With the outer race portions 68 and 70 stationary, clockwise rotation of inner race portions 62 and 64 causes ovoids 74 to roll around within the outer race portions and drive the carriers 88, 129, 46 in a clockwise direction.

Coupling 12, at this time, merely transmits the torque of the input shaft to the sun gear 32 without any multiplication. The friction drive 66, however, is conditioned for a reduction drive, and therefore multiplies the torque to the carrier 46. This combined torque from sun gear 32 and ovoid carrier 129 acting on carrier 46 causes a forward or clockwise rotation of the ring gear 38 and output shaft 40.

At the same time, the greater torque applied to carried 46 by the friction drive 66 causes sun gear 32 to be driven clockwise faster than it is being driven by the input torque from the pump 18. Turbine 20, therefore, becomes the driving member of coupling 12, and drives the blades 22 and cover 14 faster than they are being driven by the input shaft. This causes the inner race portions 62 and 64 to be increased in speed to provide a faster drive of carrier 46, and, therefore, output shaft 40. Thus, it will be seen that, due to the different torque capacities of the friction drive 66 and hydrodynamic drive 20, and because of the specific connections provided, a regenerative drive is provided.

As the speed of the input and output shafts increase, the control system will automatically operate to vary the drive ratio of the friction device 66 in infinite increments towards its minimum reduction drive position, or one approaching a one-to-one drive ratio. This results in a progressive increase in the speed of the output shaft 40 until it approaches a speed close to that of the input shaft. At this point, the sun gear 32 will be rotating at a speed closely approaching that of the speed of ovoid carrier 88, 129.

A Reverse drive is established by venting or relieving the fluid pressure behind pistons 92 and 116, and engaging Reverse brake 126 to hold carrier 46. The friction drive 66 is thus conditioned for a neutral operation, and a reverse drive is transmitted directly from the coupling 12 through the gearset 34 to output shaft 40. With the carrier held stationary, a clockwise rotation of sun gear 32 by coupling 12 causes a counterclockwise or reverse rotation of ring gear 38 and output shaft 40.

FIGURE 2 shows, schematically, a modified form of a transmission described. This figure differs from that of FIGURE 1 only with respect to the arrangement of friction drive 66. That is, in FIGURE 2, the outer race portions 68', 70' are driven by pump 18, while the inner race portions 62', 64' are held stationary by a brake 150, to provide a forward reduction drive. In all other respects, the connections and operations are the same as shown and described in connection with FIGURE 1, except for the use of a band brake 126' instead of the disc brake 126 of FIGURE 1. A further description of FIGURE 2, therefore, is believed to be unnecessary.

FIGURE 4 shows still another embodiment of the invention. In this embodiment, balls 152 are substituted for the ovoid rolling elements 74 of the FIGURES 1–3 constructions, and the connections to and between the friction driving unit 66″ and the gearset 34″ are slightly changed to provide a modification of the drive.

Pump 18 of coupling 12 in this case is connected to the outer race portions 68″ and 70″ of friction drive unit 66″.

The ball carrier member 129" is adapted to be held against rotation in a reverse direction by a one-way brake 153. This brake is of a known type having an inner annular race 154 formed as part of the carrier and spaced from an outer annular race 156 by a number of circumferentially spaced sprags or roller elements 158. Outer race 156 is fixed to the stationary transmission housing, although it could be releasably engaged with the housing by means of a selectively engageable brake band of a known type.

One way brake 153 operates in a known manner. Rearward or counterclockwise movement of carrier 129" moves sprags 158 to wedge the two races 154 and 156 together to hold carrier 129" stationary, forward or clockwise rotation of carrier 129" moving the sprags to inoperative positions and freeing the carrier for movement in this direction.

Carrier 129" is also adapted to be held against rotation in either direction by a friction brake 160 to establish a reverse drive or hill braking condition of operation. This latter brake consists of a friction disc 162 splined to carrier 129" and located between the non-rotating friction surfaces 164 of a stationary portion of the transmission housing. The brake is of a known fluid pressure actuated type, and is normally biased to a disengaged position by springs, not shown.

The two inner race portions 62" and 64" of ball drive unit 66" are connected by a drive flange 166 and a shaft 168 to the sun gear 32" of the planetary gearset 34". Ring gear 38" is connected by a driving flange 170 and a central shaft 172 to the hub 26 of turbine 20, while the planet pinion carrier 174, in this case, is formed integral with the power output shaft 40.

A direct drive through both ball drive unit 66" and the planetary gearset 34" is provided in this case by a friction clutch 176. The clutch has a friction disc 178 secured to sleeve shaft 168 between the inner ball race and sun gear 32" that is interleaved with friction discs 180 splined to the ball carrier member 129". As will be explained in more detail later, the direct drive clutch is engaged when ball drive unit 66" is conditioned for a minimum speed ratio.

The FIGURE 4 embodiment operates in the following manner. Neutral is established by conditioning the ball drive unit 66" for a speed ratio that is equal to the speed ratio of gearset 34". When this occurs, a clockwise rotation of the power input shaft 16 drives pump 18 and outer ball race portions 68" and 70" in the same direction and at the same speed. This rotates turbine 20 to rotate ring gear 38" at the same speed. The output shaft 40, being stationary, acts temporarily as a reaction member to hold carrier 174 stationary. The forward rotation of ring gear 38", causes a counterclockwise rotation of sun gear 32" at the reduction of the gearset to drive the inner ball race portions 62" and 64" at the same speed in a reverse direction.

If, as stated previously, the ball drive ratio is adjusted to be the same as the gearset reduction drive ratio, the inner ball race portions 62" and 64" will be driven in a reverse direction by the outer race at the same speed that they are being driven by sun gear 32". The ball drive carrier member 129", therefore, offers no reaction to this rotation, and it remains stationary. As a result, there is no drive of output shaft 40.

For a forward underdrive, the ball drive race portions would be adjusted axially to provide a reduction drive through the ball drive that is less than the reduction through gearset 34". Forward rotation of input shaft 16, therefore, drives pump 18 and the outer race portions 68" and 70" at the same speed. Rotation of the turbine 20 forwardly drives ring gear 38" in the same direction. With output shaft 40 stationary, the carrier 174 is held, causing a reverse or counterclockwise rotation of sun gear 32" and inner ball race portions 62" and 64".

Since the reduction drive through gearset 34" is greater than that through ball drive unit 66", the greater torque applied to sun gear 32" rotates the inner ball race portions 62" and 64" faster in a reverse direction than they are being driven by the outer ball race portions 68" and 70". This causes the ball drive carrier member 129" to attempt to rotate rearwardly, which is prevented by engagement of the one-way brake 153. This reaction acts through the inner race portions back on sun gear 32", resisting its rearward rotation. This results in a forward or clockwise rotation of carrier 174 and output shaft 40. It also results in a rotation of the ball outer race portions 68" and 70" faster forwardly than they are being driven by pump 18 and engine shaft 16, thereby applying additional torque to the outer race and pump.

As output shaft 40 picks up in speed, its load decreases, thereby decreasing the load on sun gear 32" and inner ball race portions 62" and 64". The ball drive ratio, therefore, would be progressively adjusted by means shown in FIGURE 1, in timed relationship to the increase in speed and decrease in load on output shaft 40. When the point is reached where the reaction on sun gear 32" and inner ball race portions 62" and 64" are at a minimum, and the ball drive ratio is, therefore, at a minimum underdrive reduction ratio, the direct drive clutch 176 is engaged. This causes carrier 129" and the inner ball race portions 62" and 64" to rotate together and thereby cause sun gear 32" to rotate at the speed of pump 18. The sun and ring gears are, therefore, rotating at substantially the same speeds, and in the same direction, thereby causing a lockup of the gearset. A hydraulic direct drive is thus provided from input shaft 16 to output shaft 40.

If, during the underdrive, a coast condition of operation should occur, that is, output shaft 40 becomes the driver, carrier 174 would attempt to rotate sun gear 32" and the inner ball race portions 62" and 64" forwardly. The ball carrier member 129" would rotate forwardly off the one-way brake 153 and permit a freewheeling or runaway condition of the vehicle. To prevent this, the hill brake 160 can be engaged to lock carrier 129" to the transmission housing. This, then provides a positive reduction drive through the ball drive unit 66" and, therefore, provides engine braking by the resistance of shaft 16 to faster forward rotation than it is being rotated by the engine.

A reverse drive is established by engaging reverse brake 160 and conditioning the ball drive unit 66" for a greater reduction drive than the reduction through the gearset 34". A forward drive of shaft 16, therefore, drives the outer ball race portions 68" and 70" forwardly to reversely rotate the inner race portions 62" and 64" with a greater torque than the reverse torque on sun gear 32". This forces the sun gear to rotate faster in reverse than it is being driven reversely by forwardly rotating ring gear 38" to thereby drive the carrier 174 reversely. Faster forward rotation of ring gear 38" by the ball drive unit and sun gear 32 causes turbine 20 to drive pump 18 and thereby provide additional torque to the outer ball race portions 68" and 70". A regenerative drive is thus established in reverse, as well as during the underdrive or forward speed drive range.

From the foregoing, it will be seen that the invention provides an automatic transmission of the stepless shift type, providing an infinitely smooth drive from a standstill to cruising conditions of operation. An infinite number of speed ratios is provided automatically by the infinitely variable speed friction drive and the fluid coupling, a gearset combining the output torques of the two in a manner providing a regenerative drive. Thus, the efficiency of the system is increased over one where a torque feedback system is not provided. It will also be seen that the simplified connection of the components, and the dual function of some components, such as the neutral brake and loading pistons being combined into one unit 118, reduces the cost of the transmission. Further-more, the transmission provides a smooth start up in forward and reverse by means of the fluid coupling 12.

While the invention has been illustrated in its preferred embodiments, it will be clear to those skilled in the arts to which the invention pertains that many changes and modifications may be made thereto without departing from the scope of the invention.

I claim:

1. A transmission having power input and output shafts, and a plurality of torque transmitting devices connecting said shafts for providing a plurality of drives therebetween, said devices including a mechanical infinitely variable speed friction drive unit and a hydrodynamic drive unit and a planetary gearset, said mechanical unit having rolling elements frictionally engaging inner and outer races and supported in a carrier member, said hydrodynamic unit including a pump and a turbine, said gearset having rotatable members including a driven member, first means connecting one of said races and said pump in parallel to said input shaft, second means separately connecting said turbine and carrier member to rotatable members of said gearset, means connecting said gearset driven member to said output shaft, and means for holding the other of said races stationary to provide a reduction drive from the said one race to said rolling element carrier member and gearset, said units having different torque capacities providing a regenerative drive of said friction drive unit through said connections.

2. A transmission having power input and output shafts, and a plurality of torque transmitting devices connecting said shafts for providing a plurality of drives therebetween, said devices including a mechanical infinitely variable speed friction drive unit and a hydrodynamic drive unit and a planetary gearset, said mechanical unit having rolling elements frictionally engaging inner and outer races and supported in a carrier member, said hydrodynamic unit including a pump and a turbine, said gearset having rotatable members including a driven member, first means connecting said inner race and said pump in parallel to said input shaft, second means separately connecting said turbine and carrier member to rotatable members of said gearset, means connecting said gearset driven member to said output shaft, and means for holding said outer race stationary to provide a reduction drive from the said one race to said rolling element carrier member and gearset, said units having different torque capacities providing a regenerative drive of said friction drive unit through said connections.

3. A transmission having power input and output shafts, and a plurality of torque transmitting devices connecting said shafts for providing a plurality of drives therebetween, said devices including a mechanical infinitely variable speed friction drive unit and a hydrodynamic drive unit and a planetary gearset, said mechanical unit having rolling elements frictionally engaging inner and outer races and supported in a carrier member, said hydrodynamic unit including a pump and a turbine, said gearset having rotatable members including sun and ring gears and a planet carrier, first means connecting said inner race and said pump in parallel to said input shaft, second means connecting said turbine and rolling element carrier member to said sun gear and gear-set carrier, respectively, means connecting said ring gear to said output shaft, and means for holding said outer race stationary to provide a reduction drive for the inner race to said rolling element carrier member and gearset carrier, said units having different torque capacities providing a regenerative drive of said friction drive unit through said connections.

4. A transmission having power input and output shafts, and a plurality of torque transmitting devices connecting said shafts for providing a plurality of drives therebetween, said devices including a mechanical infinitely variable speed friction drive unit and a hydrodynamic drive unit and a planetary gearset, said mechanical unit having rolling ovoid elements frictionally engaging inner and outer races and supported in a carrier member, said hydrodynamic unit including a pump and a turbine, said gearset having rotatable members including sun and ring gears and a planet carrier, first means connecting said inner race and said pump in parallel to said input shaft, second means connecting said turbine and ovoid carrier member to said sun gear and gearset carrier, respectively, means connecting said ring gear to said output shaft, and means for holding said outer race stationary to provide a reduction drive from the inner race to said ovoid carrier member and gearset carrier, said units having different torque capacities providing a regenerative drive of said friction drive unit through said connections.

5. A transmission having power input and output shafts, and a plurality of infinitely variable speed units connecting said shafts for providing a plurality of drives therebetween, said units including a mechanical ball friction drive unit and a hydrodynamic drive unit each having a plurality of rotatable members including driving and driven members, first means connecting said driving members in parallel to said input shaft, second means operably connecting said driven members to each other and to said output shaft, said units having different torque capacities to provide a regenerative drive of one of said units through said connections, and clutch means between two of the members of one of said units engagable at times to provide a fluid direct drive from said input to output shafts.

6. A transmission having power input and output shafts, and a plurality of infinitely variable speed torque transmitting units connecting said shafts for providing a plurality of drives therebetween, said units including a mechanical ball friction drive unit and a planetary gear unit each having rotatable members including driving and driven members, first means connecting said driving members in parallel to said input shaft, second means operably connecting the driven member of one of said units to another rotatable member of the other of said units, means connecting said driven member of the other of said units to output shaft, said units having different torque capacities providing a regenerative drive of said one unit through said connections, and clutch means between two of the members of one of said units engagable at times to provide substantially a direct drive through said units.

7. A transmission having power input and output shafts, and a plurality of torque transmitting devices connecting said shafts for providing a plurality of drives therebetween, said devices including a mechanical infinitely variable speed friction drive unit and a hydrodynamic drive unit each having rotatable members including driving and driven members, said devices also including a planetary gearset having sun and ring gears and a planet gear carrier, first means connecting the driving members of said units in parallel to said input shaft, second means operably connecting the driven members of said units to said ring and sun gears, respectively, and means connecting said carrier to said output shaft, said units having varying torque capacities providing a regenerative drive of one of said units through said connections.

8. A transmission having power input and output shafts, and a plurality of torque transmitting devices connecting said shafts for providing a plurality of drives therebetween, said devices including a mechanical infinitely variable speed friction drive unit and a hydrodynamic drive unit and a planetary gearset, said mechanical unit having rolling elements frictionally engaging inner and outer races and supported in a carrier member, said hydrodynamic unit including a pump and a turbine, said gearset having rotatable members including a driven member, first means connecting one of said races and said pump in parallel to said input shaft, second means operably connecting said turbine and the other of said races respectively to rotatable members of said gearset, means connecting said gearset driven member to said output shaft, one-way brake means for holding said carrier member stationary at times in one direction of rotation to provide a reduction drive from the said one race to the other and gearset, said units having different torque capacities providing a regenerative drive of said friction drive unit through said connections, and clutch means between said carrier member and one of said races engageable at times to provide a fluid direct drive from said input to output shafts.

9. A transmission having power input and output shafts, and a plurality of torque transmitting devices connecting said shafts for providing a plurality of drives therebetween, said devices including a mechanical infinitely variable speed friction drive unit and a hydrodynamic drive unit and a planetary gearset, said mechanical unit having rolling elements frictionally engaging inner and outer races and supported in a carrier member, said hydrodynamic unit including a pump and a turbine, said gearset having rotatable members including a driven member, first means connecting said outer race and said pump in parallel to said input shaft, second means operably connecting said turbine and inner race to rotatable members of said gearset, means connecting said gearset driven member to said output shaft, overrunning brake means for holding said carrier member stationary at times against rotation in one direction to provide a reduction drive from the said outer race to the said inner race and gearset, said units having different torque capacities providing a regenerative drive of said friction drive unit through said connections, and clutch means between said carrier member and said inner race engageable at times to provide a fluid direct drive between said input and output shafts.

10. A transmission having power input and output shafts, and a plurality of torque transmitting devices connecting said shafts for providing a plurality of drives therebetween, said devices including a mechanical infinitely variable speed friction drive unit and a hydrodynamic drive unit and a planetary gearset, said mechanical unit having rolling elements frictionally engaging inner and outer races and supported in a carrier member, said hydrodynamic unit including a pump and a turbine, said gearset having rotatable members including sun and ring gears and a planet carrier, first means connecting said outer race and said pump in parallel to said input shaft, second means operably connecting said turbine and inner race to said ring and sun gears, respectively, means connecting said carrier to said output shaft, and means for holding said carrier member stationary to provide a reduction drive from the outer race to said inner race and gearset sun gear, said units having different torque capacities providing a regenerative drive of said friction drive unit through said connections.

11. A transmission having power input and output shafts, and a plurality of torque transmitting devices connecting said shafts for providing a plurality of drives therebetween, said devices including a mechanical infinitely variable speed friction drive unit and a hydrodynamic drive unit and a planetary gearset, said mechanical unit having rolling ball elements frictionally engaging inner and outer races and supported in a carrier member, said hydrodynamic unit including a pump and a turbine, said gearset having rotatable members including sun and ring gears and a planet carrier, first means connecting said outer race and said pump in parallel to said input shaft, second means operably connecting said turbine and inner race to said ring and sun gears, respectively, means connecting said planet carrier to said output shaft, and means for holding said ball carrier member stationary to provide a reduction drive from the outer race to said inner race and gearset sun gear, said units having different torque capacities providing a regenerative drive of said friction drive unit through said connection.

12. A transmission as in claim 10, said means for holding said carrier member stationary comprising an overrunning brake means preventing rotation of said carrier member in one direction while permitting rotation of said carrier member in the opposite direction.

13. A transmission as in claim 12, including clutch means between said carrier and one of said races engageable at times to provide a fluid direct drive from said input to output shafts.

14. A transmission having power input and output shafts, and a plurality of torque transmitting devices connecting said shafts for providing a plurality of drives therebetween, said devices including a mechanical infinitely variable speed friction drive unit and a hydrodynamic drive unit and a planetary gearset, said mechanical unit having rolling elements frictionally engaging inner and outer races and supported in a carrier member, said hydrodynamic unit including a pump and a turbine, said gearset having rotatable members including a driven member, first means connecting said outer race and said pump in parallel to said input shaft, second means separately connecting said turbine and carrier member to rotatable members of said gearset, means connecting said gearset driven member to said output shaft, and means for holding said inner race stationary to provide a reduction drive from the said outer race to said rolling element carrier member and gearset, said units having different torque capacities providing a regenerative drive of said friction drive unit through said connections.

15. A transmission having power input and output shafts, and a plurality of torque transmitting devices connecting said shafts for providing a plurality of drives therebetween, said devices including a mechanical infinitely variable speed friction drive unit and a hydrodynamic drive unit and a planetary gearset, said mechanical unit having rolling elements frictionally engaging inner and outer races and supported in a carrier member, said hydrodynamic unit including a pump and a turbine, said gearset having rotatable members including sun and ring gears and a planet carrier, first means connecting said outer race and said pump in parallel to said input shaft, second means connecting said turbine and rolling element carrier member to said sun gear and gearset carrier, respectively, means connecting said ring gear to said output shaft, and means for holding said inner race stationary to provide a reduction drive from the outer race to said rolling element carrier member and gearset carrier, said units having different torque capacities providing a regenerative drive of said friction drive unit through said connections.

16. A transmission having power input and output shafts, and a plurality of torque transmitting devices connecting said shafts for providing a plurality of drives therebetween, said devices including a mechanical infinitely variable speed friction drive unit and a hydrodynamic drive unit and a planetary gearset, said mechanical unit having rolling ovoid elements frictionally engaging inner and outer races and supported in a carrier member, said hydrodynamic unit including a pump and a turbine, said gearset having rotatable members including a pump and a turbine, said gearset having rotatable members including sun and ring gears and a planet carrier, first means connecting said outer race and said pump in parallel to said input shaft, second means connecting said turbine and ovoid carrier member to said sun gear and gearset carrier, respectively, means connecting said ring gear to said output shaft, and means for holding said inner race stationary to provide a reduction drive from the outer race to said ovoid carrier member and gearset carrier, said units having different torque capacities providing a regenerative drive of said friction drive unit through said connections.

References Cited by the Examiner

UNITED STATES PATENTS

| | | | |
|---|---|---|---|
| 1,526,493 | 2/1925 | Dolton | 74—796 |
| 2,359,540 | 10/1944 | Bade | 74—796 |
| 3,152,490 | 10/1964 | Lemieux | 74—688 |
| 3,203,277 | 8/1965 | General | 74—681 X |
| 3,203,278 | 8/1965 | General | 74—740 X |

FOREIGN PATENTS 450,246   7/1936   Great Britain.

DAVID J. WILLIAMOWSKY, *Primary Examiner.*

J. R. BENEFIEL, *Assistant Examiner.*